United States Patent [19]
Leining et al.

[11] Patent Number: 6,080,055
[45] Date of Patent: Jun. 27, 2000

[54] METHOD AND APPARATUS FOR STRIPPING CASINGS FROM SAUSAGES

[75] Inventors: Lyndon R. Leining; Eric S. VanDenBerg, both of Austin; William D. Young, Albert Lea, all of Minn.

[73] Assignee: Hormel Foods, LLC, Austin, Minn.

[21] Appl. No.: 09/167,386

[22] Filed: Oct. 6, 1998

[51] Int. Cl.[7] .................................................. A22C 11/00
[52] U.S. Cl. ............................................................ 452/50
[58] Field of Search ........................................ 452/50, 49

[56] References Cited

U.S. PATENT DOCUMENTS

| | | |
|---|---|---|
| 2,424,346 | 7/1947 | Wilcoxon . |
| 2,434,316 | 1/1948 | Golden et al. . |
| 2,725,591 | 12/1955 | Cline et al. ................................ 452/50 |
| 2,757,409 | 8/1956 | Parkes et al. ............................. 452/50 |
| 2,800,681 | 7/1957 | Demarest .................................. 452/49 |
| 4,118,828 | 10/1978 | Melanson . |
| 4,222,150 | 9/1980 | Andersen . |
| 4,414,707 | 11/1983 | Koken ....................................... 452/50 |
| 4,463,641 | 8/1984 | Sato .......................................... 83/175 |
| 4,682,387 | 7/1987 | Leining . |
| 5,928,073 | 7/1999 | Andersson et al. ....................... 452/50 |

*Primary Examiner*—Willis Little
*Attorney, Agent, or Firm*—Mau & Krull, P.A.

[57] ABSTRACT

A method and apparatus is provided for removing casings (15a) from elongated casing enclosed sausage sticks (15). An indexing conveyor (22) receives the casing-enclosed sausage sticks (15). An inflating mechanism is provided for inflating the casing-enclosed sausage sticks. An end cap removal section provides for the removal of the end caps. A casing slitting mechanism laterally slits the casings and the casings are then removed in a direction generally perpendicular to the length of the sausage sticks. Preferably a mechanism is provided for removal of the casings after they have been taken off from the sausage sticks by means of forced air.

19 Claims, 10 Drawing Sheets

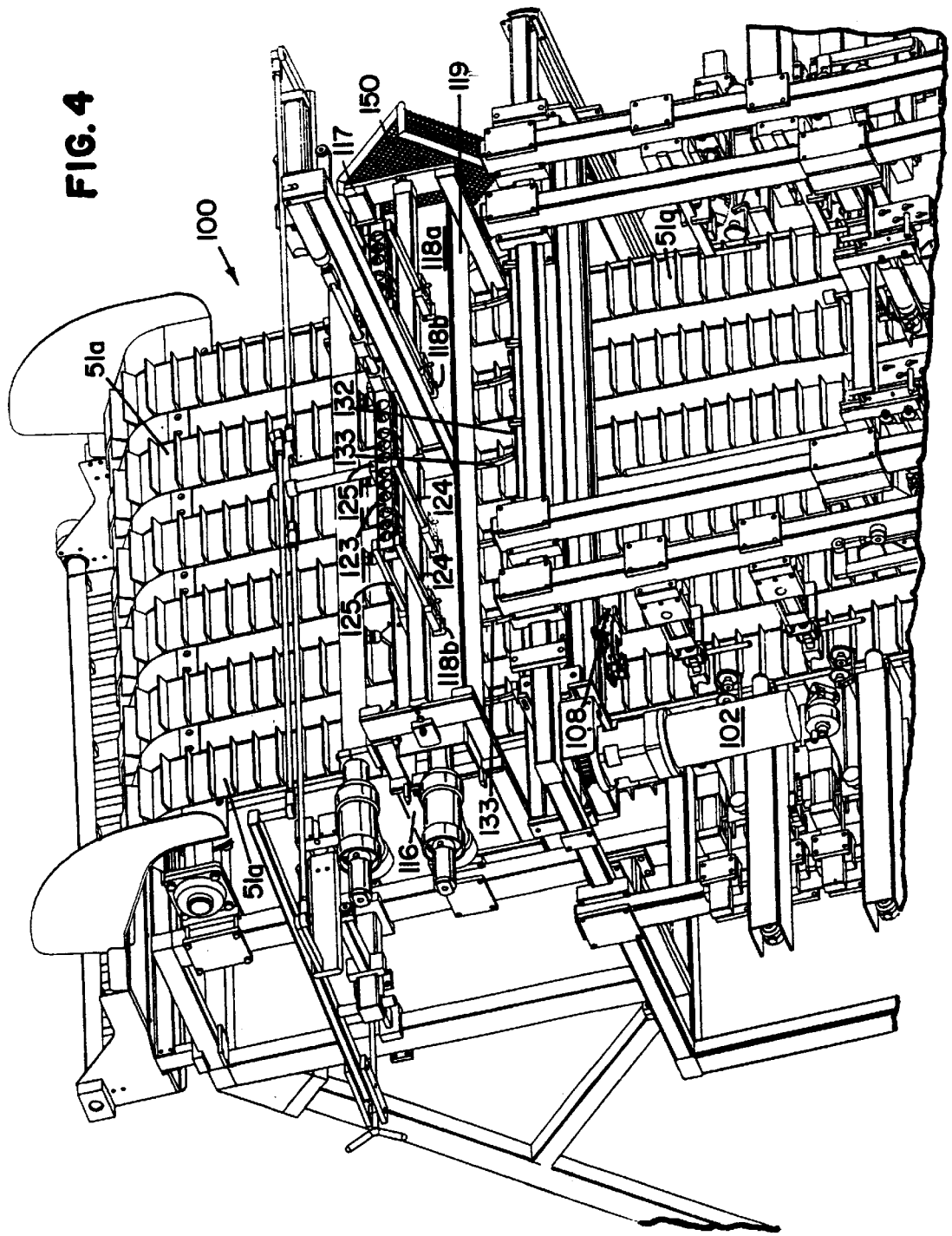

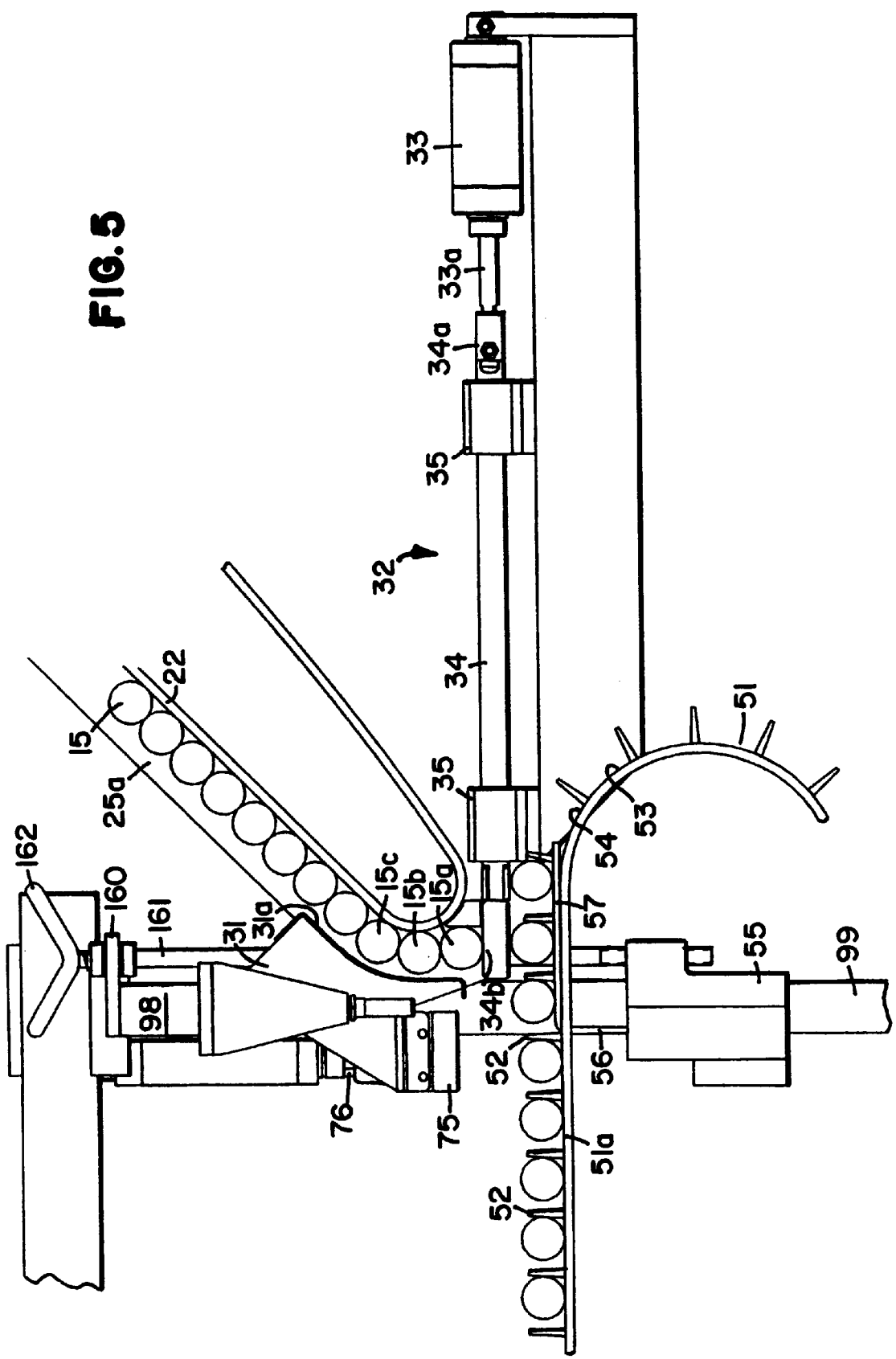

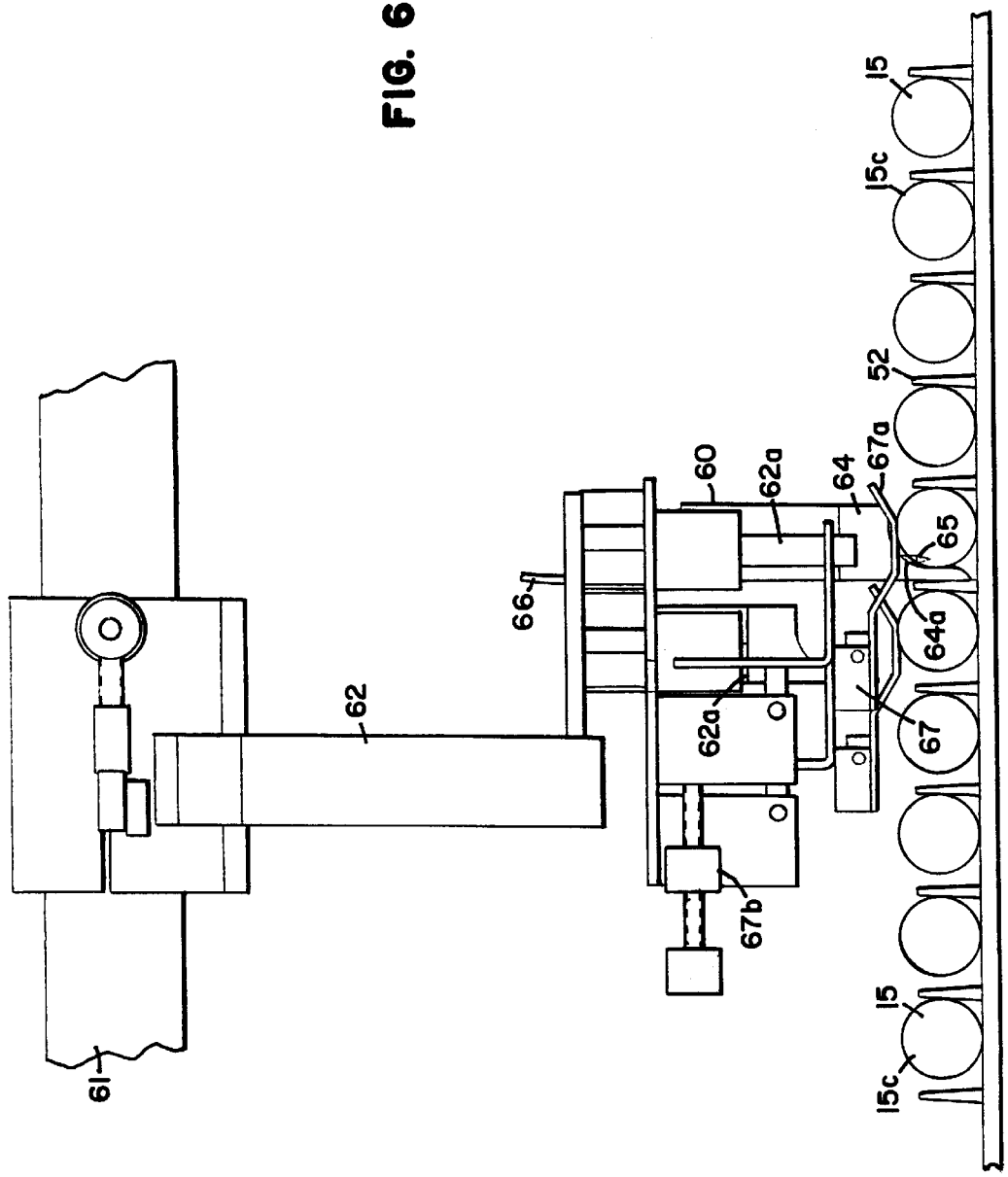

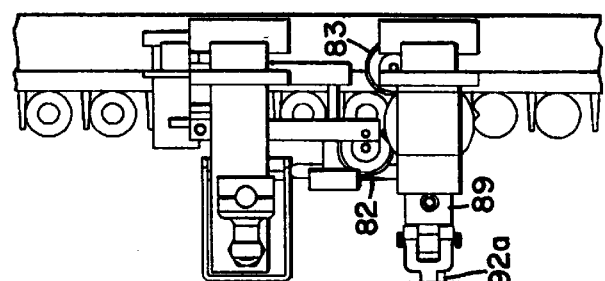
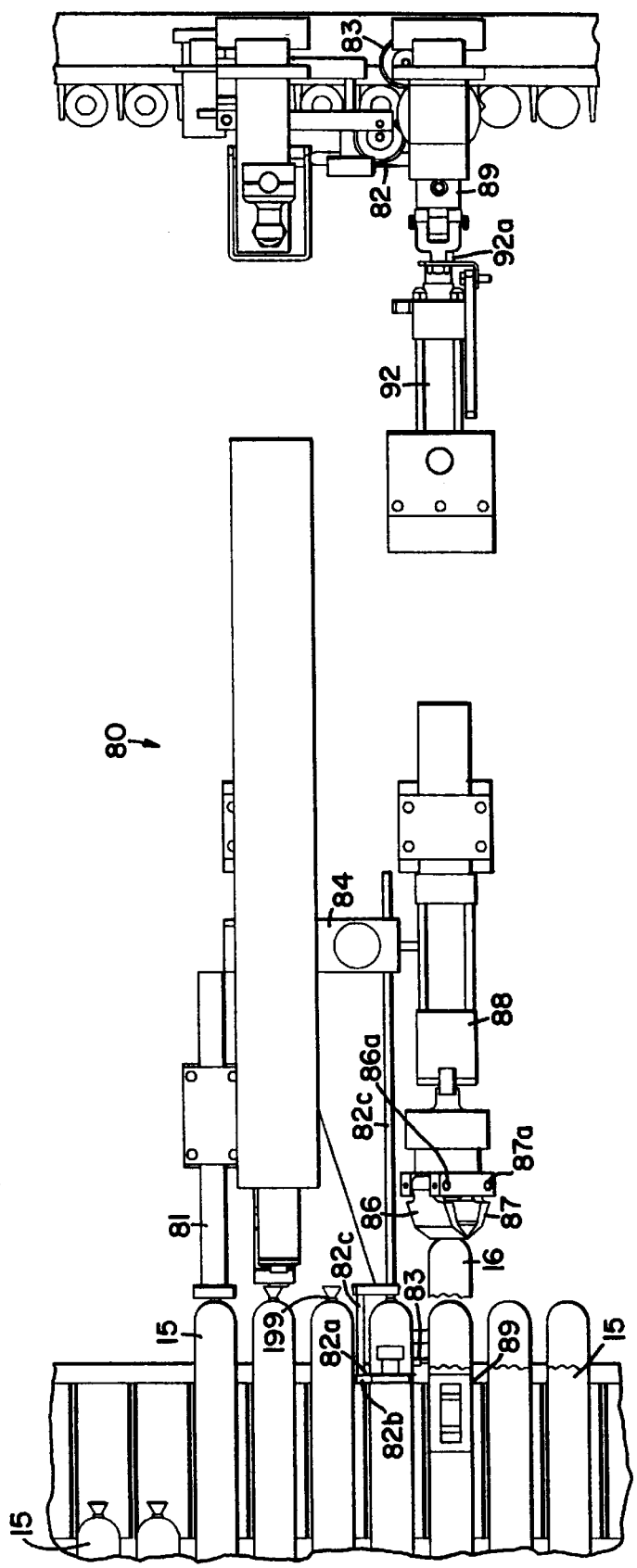

METHOD AND APPARATUS FOR STRIPPING CASINGS FROM SAUSAGES

BACKGROUND OF THE INVENTION

1. Field of the Invention

This invention relates to a method and apparatus for stripping casing from sausage sticks.

2. Description of the Prior Art

Sausages, such as pepperoni sausages, are formed in a stuffing operation in which the sausage emulsion is stuffed into a casing. The sausage stuffed casings are then clipped, smoked and further processed until the sausages are completely formed. After the sausages are formed, the casing is often removed to permit slicing of the sausage sticks for sale to consumers or institutions. Removal of the casing from the sausage sticks may be accomplished in a manual operation. However, such an operation is both time consuming and labor intensive. U.S. Pat. No. 4,682,387 discloses a mechanical method and apparatus for removing casings from sausage sticks. The apparatus includes an indexing device which moves the sausages in an arcuate path during which the front end of the sausage stick is severed. The sausage sticks are then moved horizontally, front end first, by a positioning conveyor, and the front edges of the casings are engaged by a casing stripper device. The casing is pulled from the sausage stick as the latter is moved by a positioning conveyor. The decased front end of the sausage stick is gripped by a movable gripper device which pulls the sausage from the casing. An ejector mechanism ejects the sausage from the gripper device.

While the above-noted apparatus have provided for improvements in stripping of casings from casing enclosed sausage sticks, there is still a need for an improved apparatus which effectively deals with various sizes of sausages as well as other improvements in the removal method and apparatus.

SUMMARY OF THE INVENTION

In one embodiment, the invention is an apparatus for removing casings from elongated casing-enclosed sausage sticks. The apparatus includes an indexing conveyor for receiving casing-enclosed sausage sticks. An inflation mechanism inflates the casing-enclosed sausage sticks and a casing end cap removal mechanism removes casing end caps from the casing-enclosed sausage sticks. A casing slitting mechanism is provided and slits the casings and finally a casing removal mechanism removes the casings from the casing-enclosed sausage stick.

In another embodiment, the invention includes a disposing apparatus for disposing of end caps and elongated casings of casing-enclosed sausage sticks after removal by a removal apparatus having an end cap removal mechanism and elongated casing removal mechanism. The disposing apparatus includes a collection container positioned below an end cap removal mechanism for receiving end caps. The container has an opening to receive the end caps. A housing is included for at least partially enclosing an elongated casing removal mechanism. A source of forced air is provided and a conduit is operatively connected from the source of forced air. The conduit has an exit opening proximate the casing removal mechanism, wherein forced air blows and removes the elongated casings.

In another embodiment, the invention is a method for removing casings from elongated casing-enclosed sausage sticks. The method includes supplying a plurality of elongated casing-enclosed sausage sticks to an indexing conveyor. Then, the sausage sticks are inflated, whereby the casing is expanded away from the sausage sticks. The end caps are then removed from the sausage sticks. Slitting the casing along the length of the sausage sticks creates a loose edge of the casing. Next, the loose end of the casing is grasped and the casing removed.

In another embodiment, the invention is a method of removing casings from casing-enclosed sausage sticks. The method includes supplying a plurality of elongated casing-enclosed sausage sticks to an indexing conveyor. Then, the end caps from the sausage sticks are removed and the casing is slit along a length of the sausage stick, thereby creating a loose edge of the casing. The loose edge is then grasped and pulled in a direction generally perpendicular to the longitudinal axis of the sticks.

BRIEF DESCRIPTION OF THE DRAWINGS

FIG. 4 is an enlarged perspective of the casing removal section of the apparatus shown in FIG. 1;

FIG. 5 is a schematic side view of the input end shown in FIG. 2;

FIG. 6 is a schematic side view of the inflating portion of the apparatus shown in FIG. 1;

FIG. 7a is a schematic top view of the end cap removal section of the apparatus shown in FIG. 1;

FIG. 7b is a schematic end view of the end cap removal section of the apparatus shown in FIG. 1;

DETAILED DESCRIPTION OF THE PREFERRED EMBODIMENT

Figure 1:
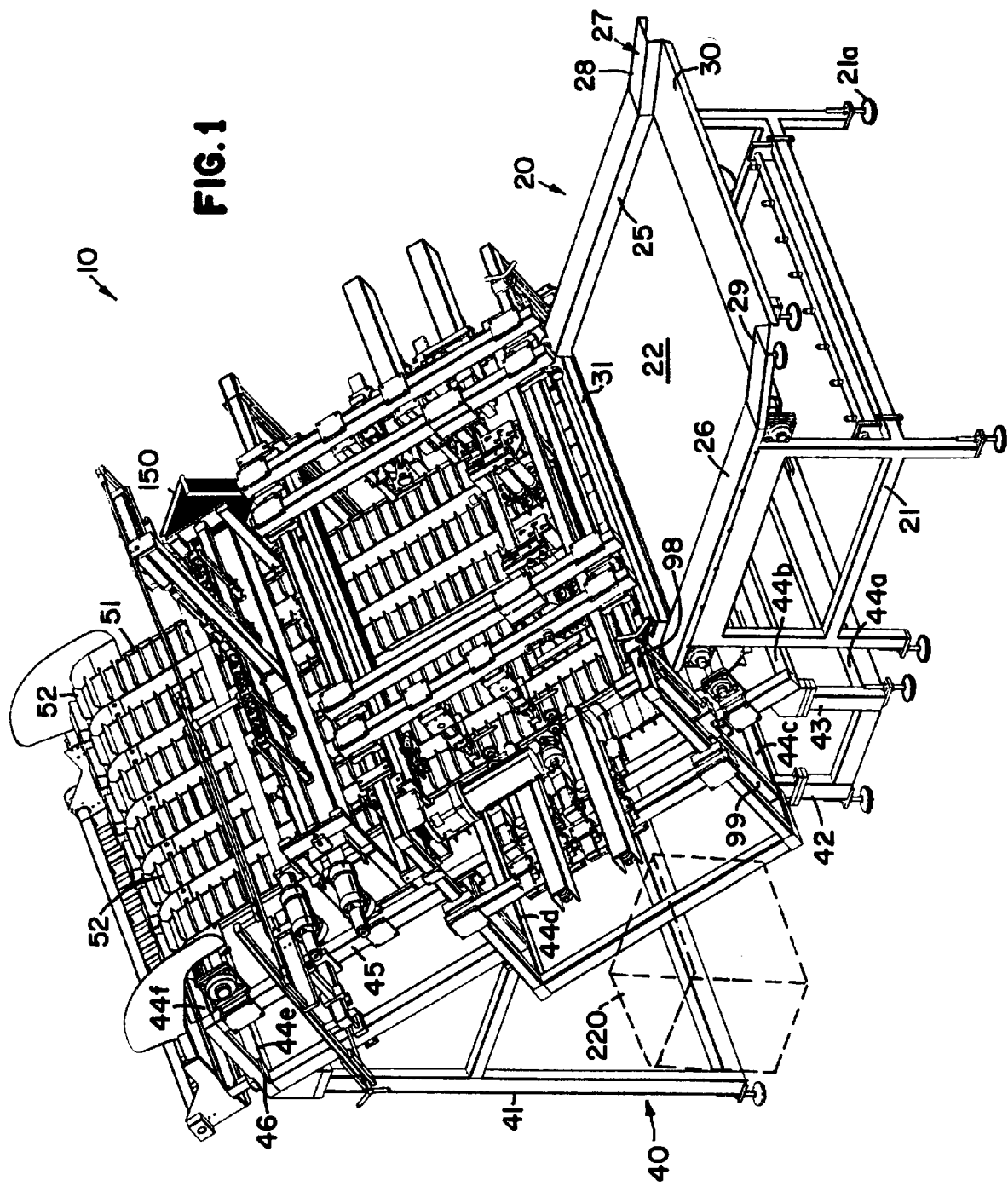
FIG. 1 is a perspective view of the apparatus for stripping casings from sausages in accordance with the present invention.

Referring to the drawing, wherein like numerals represent like parts throughout the several views, there is generally disclosed at 10 a casing stripping apparatus. The apparatus 10 includes an input section, generally designated as 20 and shown in FIG. 2 an intermediate section generally designated at 50 and shown in more detail in FIG. 3 and a casing removal section generally designated at 100 and shown in FIG. 4. The input section 20 is generally for the positioning and loading of casing-enclosed sausage sticks 15, having an outer casing 15c, into the intermediate section 50 where the sausage sticks 15 are inflated by air and the end caps removed. Then, the sausage sticks 15 are moved to the casing removal section 100 where the casings are slit and removed.

Figure 2:
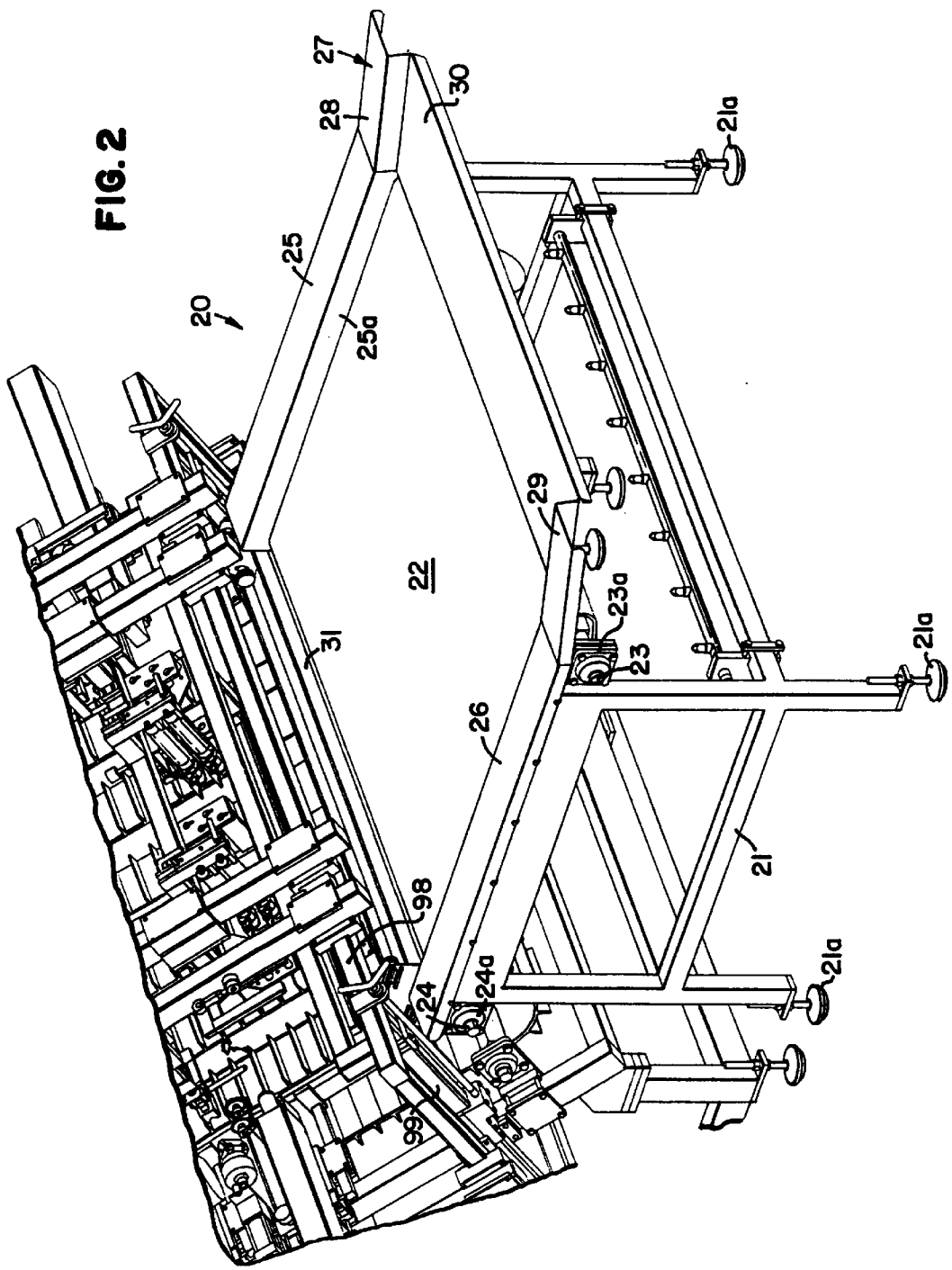
FIG. 2 is an enlarged perspective of the input end of the apparatus shown in FIG. 1.

Referring to FIG. 1 and in more detail FIGS. 2 and 5, the input section 20 is shown in more detail. A frame 21 supports an input conveyor 22. The input conveyor has first and second shafts 23 and 24 supported by suitable bearing housings 23a and 24a which are in turn supported by the frame 21 by means well known in the art. The frame 21 has four screw threaded leg leveling mechanisms 21a to level the frame and thereby the input conveyor 22. The input conveyor 22 is generally horizontal with respect to the floor. The input conveyor is powered and controlled by means well known in the art.

The input section 20 has a right side 25 and a left side 26. Both sides 25 and 26 have a generally vertical section 25a which keep the sausage sticks 15 from going off the side of the conveyor 22. An apron 27 is positioned at the front of the input conveyor 22. The apron 27 has sides 28 and 29 which are shaped generally similar to sides 25 and 26. The apron 27 also has a receiving area 30 on to which the sausage sticks 15 are placed. The receiving area 30 is inclined downward so as to feed the sausage sticks 15 on to the conveyor 22. The sausage sticks 15 have a length which is less than the distance between the sides 25 and 26. An operator will typically position the sausage sticks 15 on the input conveyor 22 so that the sausage sticks 15 are in alignment, as generally shown in FIG. 5. There, the sausage sticks 15 are shown in alignment on the conveyor 22 with the length of the sausage extending between the sides 25 and 26. Further, the sausages are stacked side-by-side and not on top of each other. The input conveyor 22 provides a staging mechanism for positioning the casing-enclosed sausage sticks 15 to an indexing conveyor 51 of the intermediate section 50. The indexing conveyor 51 extends from underneath and proximate the discharge end of the input conveyor 22 and through the intermediate section 50 and the casing removal section 100. The indexing conveyor 51 has a plurality of cleats 52 which extend across the width of the conveyor 51. As shown, the indexing conveyor 51 comprises six separate conveyors with spaces between. The indexing conveyor 51 is inclined at an angle of approximately 45° and the cleats 52 hold the sausage sticks 15 in place as they are being transported. The cleats 52 form slots into which the sausage sticks 15 fall as will be described hereafter.

Referring to FIG. 5, a top plate 31 has a curved bottom wall 31a which guides the sausage sticks 15 as they come to the discharge end of the input conveyor 22. Further, the top plate 31 is spaced at a distance from the conveyor 22 such that two stacked sausage sticks 15 are not able to pass between the top plate 31 and the conveyor 22. An infeed pusher 32 is mounted by suitable means to the frame 21 under the input conveyor 22. The infeed pusher 32 includes a piston 33 which has an arm 33a which moves in and out as the piston 33 is actuated. The arm 33a is connected to a push rod 34 at its first end 34a. The push rod 34 is supported by suitable bearings 35. The second end 34b of push rod 34 engages the sausage sticks 15. The push rod 34 is shown in an extended position in FIG. 5. In this extended position, the second end 34b prevents the sausage sticks 15 from falling farther downward. The cleats 52 form a first slot 53 and a second slot 54. In FIG. 5, the first sausage to be positioned into the indexing conveyor 51 is designated 15a and the second sausage is designated 15b. The indexing conveyor would be indexed so that the first slot 53 would be positioned under the second end 34b of the push rod. This is a position where the conveyor 51 has been indexed two positions forward from that shown in FIG. 5. Then, the piston 33 is activated retracting the arm 33a and thereby the push rod 34. This allows the first sausage 15a and the second sausage 15b to fall downward with the first sausage 15a entering the first slot 53. At this time, the second sausage would be positioned adjacent the end of the second end 34b. Then, the piston 33 is activated extending the push rod 34 so that the end of the push rod 34b pushes the second sausage 15b forward into the second slot 54. The top of the second end 34b then acts as a barrier for the next sausage in line 15c from dropping down further until the indexing conveyor 51 moves forward an additional two slots, wherein the process is repeated.

The indexing conveyor 51 has a bed 51a extending between the cleats and forms a surface on which the sausage sticks 15 ride. The sausage sticks 15 are not supported between the six sections of the conveyor 15. However, if different diameter sausage sticks are used, it is desirable to adjust the height of the bed as the sausages are first entering the slots. Rather than adjust the conveyor bed height, the present invention provides an alternate support bed. The alternate support bed is positioned between the separate conveyors forming the indexing conveyor 51.

A slidable block 55 is positioned around the frame member 99. Attached to a top frame member 98 is a bracket 160. A rod 161 having a handle 162 is positioned in an opening of the bracket 160 and the rod 161 extends into a threaded opening in the block 55. By turning the handle 162, the rod 161, which is stationary, rotates and causes the block 55 to move up and down. Attached to the block 55 is an upright arm 56 which extends across the length of the apparatus 10 and terminates in a similar block on the right side of the apparatus 10. Flat plates 57 are connected to upright member 56 at a plurality of locations between the components of the indexing conveyor 51. The flat plates are adjustable from an elevation level with the bed 51a, where the bed 51a supports the sausage sticks, to a higher elevation (as shown in FIG. 5) where the flat plates 57 support the sausage sticks above the bed 15a. Then, as the block 55 moves upward, the flat plates 57 also move upward raising the sausage sticks 15 off of the bed 51a and on to the plates 57 which are positioned between the beds 51a. By doing so, the push rod 34 will be able to contact the sausages 15b proximate their center, independent of the diameter by making the necessary adjustments with the sliding block 55.

The intermediate section 50 includes mechanisms for inflating the sausage sticks 15 as well as removing the end caps of the sausages. There are two sets of mechanisms for both operations. Only one of each will be described in detail, it being understood that the other mechanisms are similar. Having two sets of mechanisms will allow the machine to be run at a faster speed by performing each operation on two different sausage sticks 15 at the same time.

The indexing conveyor 51 transports the sausage sticks 15 through the intermediate section 50 and the casing removal section 100. A frame, generally designated at 40, as shown in FIG. 1, supports both the intermediate section 50 and the casing removal section 100. The left side of the frame 40 is shown in FIG. 1, the right side being a mirror image thereof. Generally, the frame 40 includes rear upright member 41 and front upright members 42 and 43. There are suitable cross support members 44a, 44b, 44c, 44d, 44e and 44f. Inclined member 45 extends underneath the intermediate section 50 and removal section 100 between the front member 43 and rear member 41 via support member 46. The inclined member 45 is at a 45° angle, the same as the indexing conveyor 51 as the indexing conveyor 51 is carried by the frame 40.

Figure 3:
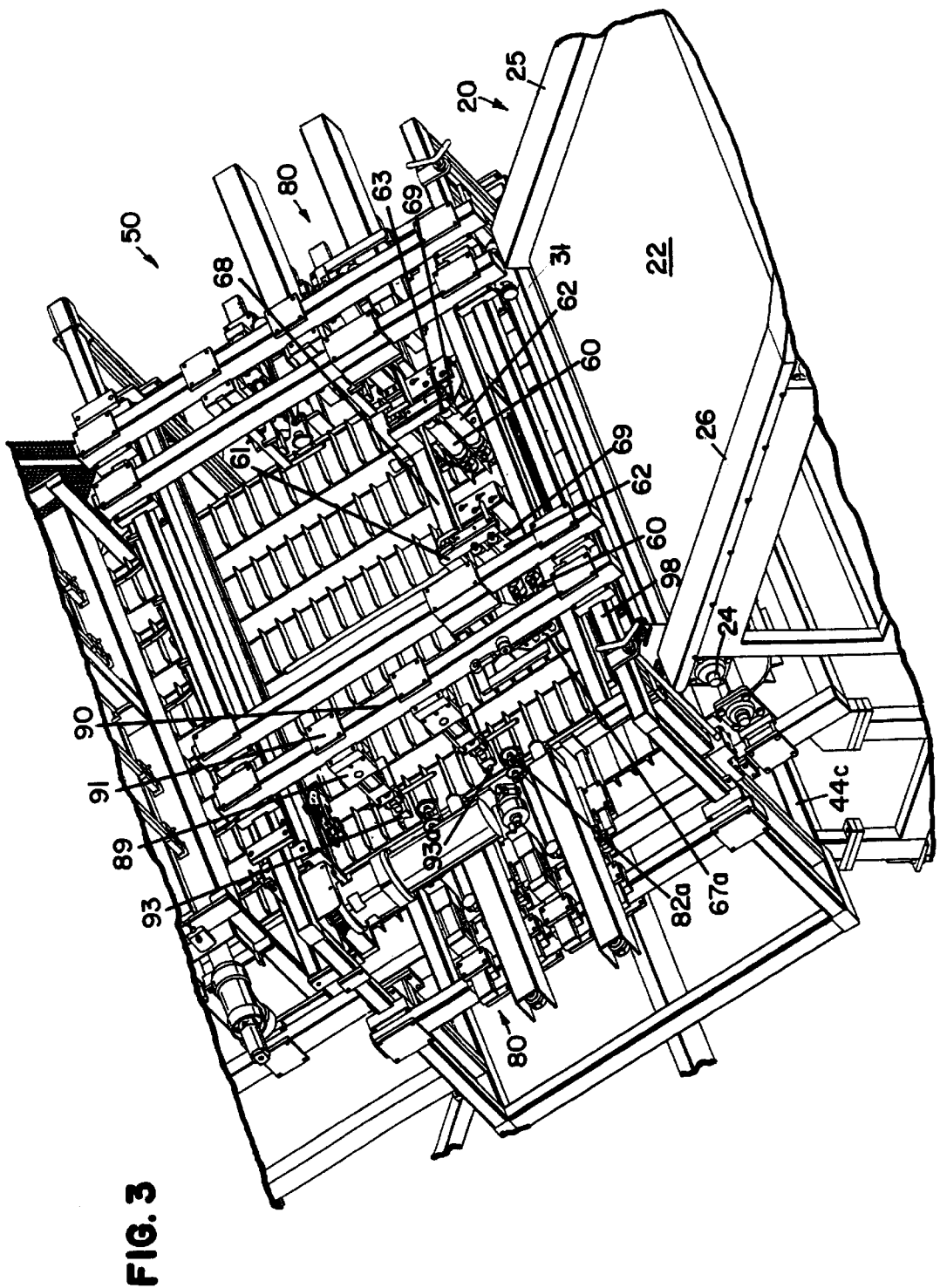
FIG. 3 is an enlarged perspective of the slitting mechanism of the apparatus shown in FIG. 1.

As the sausage sticks 15 proceed through the intermediate section 50, two operations are performed. The first is the inflation of the sausage sticks, so as to expand the casing around the sausage sticks away from the sausage emulsion and also the end cap removal operation. As shown in FIG. 3, there are four needle block assemblies 60. Each sausage stick 15 has two needle blocks that provide air to inflate the casing. Four needle blocks are utilized as two rows of sausage sticks are acted upon at the same time. The right needle blocks are approximately the same distance from the center line as the left needle blocks so as to inflate each side of the sausage stick 15. Only one needle block will be described in detail as they are similar.

The indexing conveyor 51 does not move continuously. Instead, it indexes forward two slots at a time. There is then a dwell time in which the operations are performed and then the indexing conveyor moves forward two slots again. In viewing FIG. 5, there is a hold-down plate 75 which is movable on a cylinder 76. The hold-down plate 75 is shown in the up position in FIG. 5. Just prior to the indexing forward of the indexing conveyor 51, the cylinder 76 is actuated moving the hold-down plate 75 to a position just above the top of the sausage sticks 15. Then, the conveyor is indexed forward. The purpose of the hold-down plate 75 is to prevent any of the sausage sticks 15 from being brought back over the top of the cleats if a string on the sausage is caught in the mechanisms near the loading on to the indexing conveyor 51. The sausage sticks 15 are typically tied with string around their end caps and it is this string that sometimes becomes caught. The top plate 75 prevents the movement back of the sausage sticks 15 as the string would break against the force provided by the hold-down plate 75. Then, after the indexing conveyor 51 is indexed forward, the top plate is moved up and out of the way.

An L-shaped bracket 61 pivotally supports the needle block assembly 60. An air cylinder 62 is mounted to the bracket 61 in such a manner that it may pivot about point 63. The brackets 61 are mounted to a support 68. The support 68 may be moved (as viewed in FIG. 3) up or down. For larger diameter sticks the support 68 is moved up and for smaller sticks is moved down. The air cylinder 62 has a rod 62a which can be extended and retracted. As shown in FIG. 6, the rod 62a to the right is extended in a down position and the rod 62a for the left needle block is shown retracted. A mounting block 64 is attached to the end of the arm 62a and a needle 65 is operatively connected to the mounting block 64. The block 64 has a curved positioning surface 64a which contacts the sausage sticks 15. Cylinder stops 69 limit the pivoting movement of the cylinders 62. Gravity tends to position the cylinders 62 against the stops 69. A biasing force, such as a spring, may also be utilized to urge the cylinder 62 against the stops 69. Pressurized air enters tubing 66 which is in fluid communication with the needle 65. A source of pressurized air (not shown) is provided to the tubing 66. Preferably, an antibacterial filter is used. A valve (not shown) is used to control the flow of air of the pressurized air to the needles for inflation at the appropriate time. Typically, two needles will be mounted in the mounting block 64. As viewed in FIG. 6, the second needle would be behind the needle shown. As the needle 65 is inserted into the sausage stick 15 upon the downward movement of the needle, pressurized air is allowed to enter the needle, thereby inflating the casing away from the sausage emulsion. A proximity switch 67 has a detecting arm 67a which rests on top of the sausage stick 15. As the casing is inflated, the detecting arm 67a will pivot and at a given height will turn off the supply of pressurized air to the needle 65. This will prevent the over inflation of the casings and the subsequent explosion, much like a balloon bursting. When the casing explodes, the removal of the casing becomes more difficult. The amount of travel of the arm 67a required to trip the proximity switch is adjustable by means of the adjustment knobs 67b.

After the sausage sticks 15 have been inflated, the indexing conveyor brings the inflated sausage sticks 15 to the end cap removal section of the intermediate section 50. This is best seen in FIGS. 3, 7a and 7b.

There are four end cap removal units, generally designated at 80. Two units are on the right and two units are on the left. This allows for two different sausage sticks 15 to be operated on simultaneously, before the indexing conveyor is indexed forward two positions and performing the removal operations on the next two sausage sticks 15. Since the end cap removal units 80 are identical, only one will be described in detail. The end cap removal unit 80 pushes the sausage stick 15 into a reference position, scores the casing and finally mechanically grasps the casing and removes the end cap of the casing.

The end cap removal unit 80 includes a push rod 81 that is connected to a suitable cylinder for actuation and movement of the push rod 81 in a direction along the longitudinal axis of the sausage stick 15. The push rod 81 acts to both push the sausage stick 15 across the indexing conveyor 15 until it reaches the corresponding push rod 81 on the other side where the corresponding push rod 81 then acts as a stop to position the sausage stick 15. As shown in FIG. 7a, the sausage stick 15 next to the push rod 81 has been pushed in position by the corresponding push rod on the other side of the indexing conveyor. Upon hitting the push rod 81, the sausage stick 15 is in position for further operations. The sausage stick 15 then passes under and upper circular knife 82 and a bottom circular knife 83. The bottom circular knife 83 is mounted to a stationary side of the indexing conveyor 51. Thereby, as the indexing conveyor 52 moves past the knife 83, the bottom portion of the casing is scored. The height at which the bottom circular knife 83 is mounted determines the amount of casing that becomes scored. Typically, the knife 83 is mounted such that the bottom one-fourth of the circumference of the sausage stick 15 is scored. The top circular knife also scores the top one-fourth of the circumference of the sausage stick 15. However, the top circular knife 82 is spring mounted so that it can ride up and over the sausage stick 15 as it passes underneath. The amount of tension and positioning of the circular knife 82 will determine the amount of scoring that takes place. Typically, it is also set to score one-fourth of the top portion of the casing. One suitable method would be to have the circular knife blade 82a rotatably mounted on a block 82b. Then a rod 82c is mounted to the block 82b. The rod 82c provides for the spring which allows the circular knife blade 82a to move upward as the sausage stick 15 passes underneath. As shown in FIG. 7a, the rod 82c has a first and second component which is then mounted at its other end in a mounting block 84. As can be seen in FIG. 7a, the top and bottom blades 82 and 83 are longitudinally offset approximately one-fourth of an inch. Thereby, the top score on the sausage stick is offset from the bottom score, providing for a better tearing action.

Next, the sausage stick 15 is indexed to the station where the end cap (a portion of the overall casing 15c) is removed. The casing end cap 16 is shown in FIG. 7a as being grasped by the clamp 85. The clamp 85 has opposable jaws 86 and 87 which are pivotally mounted about points 86a and 87a. The jaw assembly is operatively connected to a movable rod 88 which moves the jaws 86 and 87, as a unit, to the right or left as shown in FIG. 7a. Also, suitable control mechanisms (not shown) are utilized for controlling the opening and closing of the jaws 86 and 87. The jaws 86 and 87 are in an open position and then moved to the left over the end cap 16 when it is still connected to the sausage stick 15. Then, the jaws 86 and 87 are closed. The jaws grasp the end cap 16 proximate where a string 199 is used to tie off the casing. At the same time, a hold-down mechanism 89 is actuated and is lowered to come in contact with the sausage stick 15. The hold-down mechanism 89 contacts the sausage stick 15 such that it is inside of the score lines. Then, the jaws 86 and 87 are moved to the right, tearing the remaining portion of the casing which has not been scored and the entire end cap 16 is removed. The hold-down mechanism 89 is mounted to frame 90 by bracket 91. An air cylinder 92 has an arm 92a which is extended and retracted. A block 93 is attached to the arm 92a. The bottom of the block 93 has a curved surface 93a which contacts the mating curved surface of the sausage stick 15 when the hold-down mechanism 89 is extended.

The indexing conveyor 51 then carries the sausage sticks 15 to the casing removal section 100. This section 100 is best seen in FIGS. 4 and 8 through 10. In the casing removal section 100, the remaining casing which is surrounding the sausage stick 15 is then slit longitudinally from one end cap area to the other end cap. Then, the loose casing is grasped, pulled up such that it is completely removed from the sausage stick and then blown away and discarded.

Figure 8:
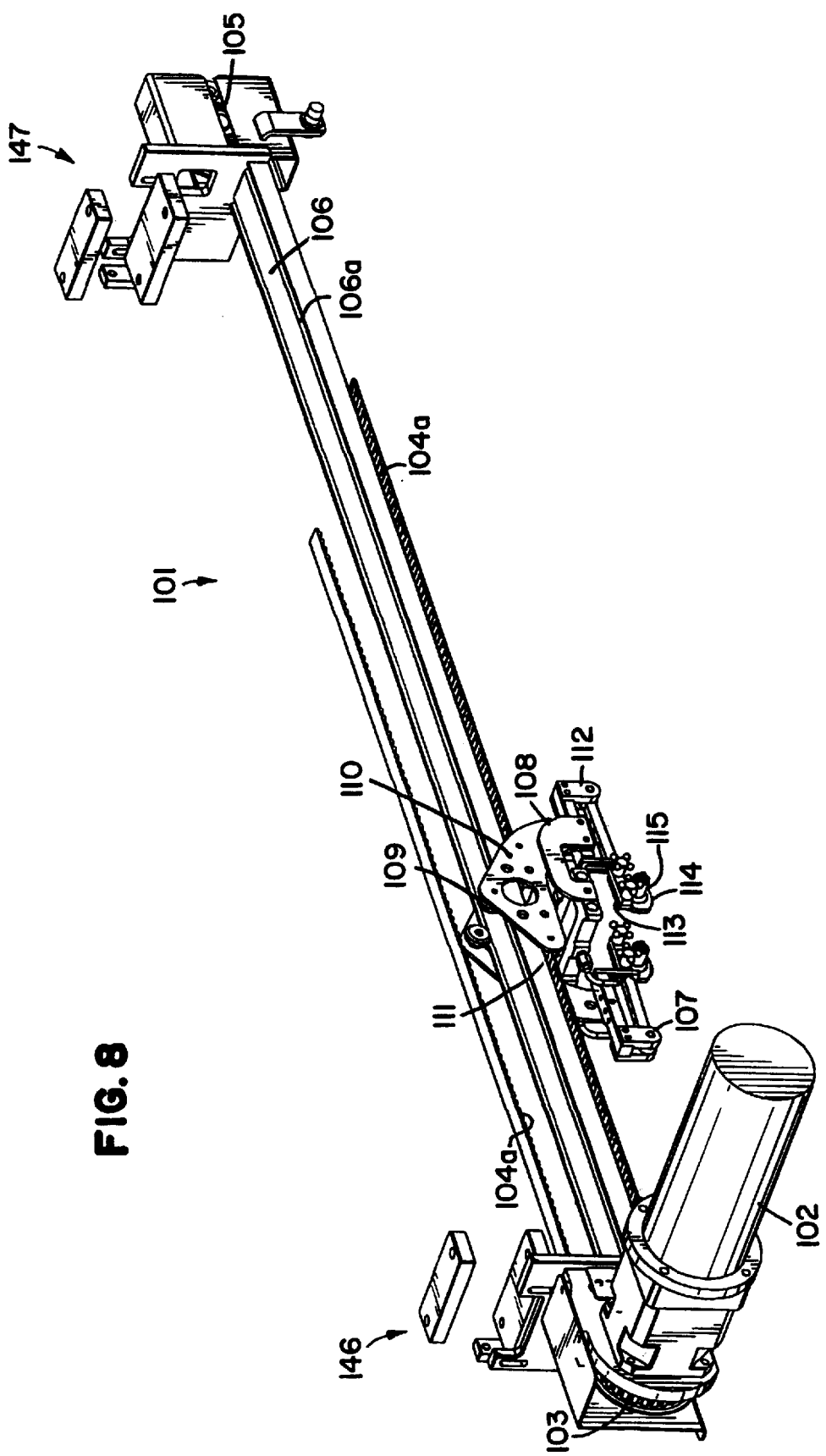
FIG. 8 is a perspective view of the slitting mechanism of the apparatus shown in FIG. 1.

The remaining casing is slit by the slitting mechanism, generally designated at 101 and shown in FIG. 8. The slitting mechanism 101 includes a servo motor 102 having a drive wheel 103. A drive belt 104, which has a plurality of teeth 104a, is driven 110 by the drive wheel 103 and revolves around idler wheel 105 at its other end. The slitting mechanism 101 is connected to the frame by means of brackets 146 and 147. A guide bar 106 is similarly carried by brackets 146 and 147 and is positioned between the top and bottom of the drive belt 104. Two knife blade assemblies 107 and 108 are supported on the guide bar 106 and travel along the length of the guide bar 106. The guide bar is positioned at a height such that the knife blade assemblies 107 and 108 are able to score the casing on the sausage sticks 15 along its longitudinal length. The knife blade assemblies 107 and 108 are identical and therefore only one will be described in detail.

The knife blade assembly 108 has a geared tooth roller 109 which is driven by the teeth 104a of drive belt 104. For clarity purposes in FIG. 8, the drive belt is shown spaced apart from the roller 109. However, in actual construction, the drive belt 104 mates with the roller 109 to provide a driving force for the knife blade assembly 108. The roller 109 rides in a groove 106a in the guide bar 106. The roller 109 is rotatably mounted on an arm 110 which has two additional rollers 111 rotatably attached. The two additional rollers 111 are rotatably attached and positioned to engage the underneath side of the guide bar 106. Only one of the rollers 111 is shown. A rectangular shaped knife holder 112 is connected to the arm 110 by suitable means such as rivets. At one end of the knife holder 112 is suspended an extension arm 113. The circular knife 114 is rotatably mounted to the extension arm 113. As the knife blade assembly 108 is driven across the longitudinal length of the sausage stick 15, the circular knife 114 engages the casing and scores the casing along its longitudinal length. The circular knife 114 is free to rotate around shaft 115. By rotating around 360 degrees, the entire 360 degrees of the knife blade surface may be utilized as opposed to a single point if a traditional blade was used. By using the 360° surface, the life of the knife blade is extended as there is a larger surface to cut the casing and thereby spread out the wear, as opposed to a single point knife where wear would concentrate in a single area.

Next, the indexing conveyor moves the sausage sticks 15 to the gripping and lifting mechanism to remove the remaining casing. Support for the gripping and lifting mechanism is provided by a first inverted U-shaped frame 116 on the left side and a second inverted U-shaped frame 117 on the right side of the apparatus 10. A housing 118 partially encloses area where the gripping members 124 and 125 move the removing casing. The housing 118 has a top member 118a. The top member 118a is connected between the frames 116 and 117 and has downwardly depending sides 119. An upright member 120 is mounted on the top 118a. Supported by the upright member 120 is a cylinder 121 which has an arm 122 which, upon activation, moves vertically. Attached to the arm 122 is a longitudinal support bar 123. Attached to the longitudinal support bar are two sets of gripping members 124 and 125. As shown in FIG. 4, there are four gripping members in each set. Gripping members 124 are used for one sausage stick 15 and the second set 125 is used for the adjacent sausage stick 15. The end of the gripping members 124 and 125 are gripping blocks which have a concave surface 124a 125a respectively. The concave surfaces 124a and 125a extend along the length of the block. There is an opening 118b proximate each of the gripping members 124 and 125 so that the gripping members 124 and 125 may pass through the top 118. Underneath the indexing conveyor 51 is a somewhat similar, mating assembly. A mounting member 126 is connected to the frame of the casing stripper 10, to which a cylinder 127 having an arm 128 is attached. The arm 128 is, upon activation, moved in a vertical direction. A longitudinal support bar 129 is connected to the end of the arm 128, similar to support bar 123. Attached to the support bar 129 are a plurality of gripping member 130 and 131. For each gripping member 124 and 125, there is a matching gripping member 130 and 131. The end of the gripping members 130 and 131 are convex and are configured to mate with the concave surface 124a and 125a.

A mounting bracket 132 holds a plurality of flexible fingers 133. The flexible fingers 133 are spaced across the length of the apparatus 10. As the slit casings are passed underneath the fingers 133, the fingers 133 tend to grasp (by friction) and separate the casing from the sausage stick emulsion and lift the casings vertically upward, so as to assist in the gripping which will be described in more detail hereafter. Also, in order to properly align the loose ends of the slit casing, pressurized air is forced out through a plurality of nozzles 134 which are connected to tube 135. The tube 135 has a central bore 135a to which air passes to the nozzles 134. In addition, since the indexing conveyor is at a 45° angle, gravity will also help align the end flaps of the slit casing, which are designated as 148.

Figure 10:
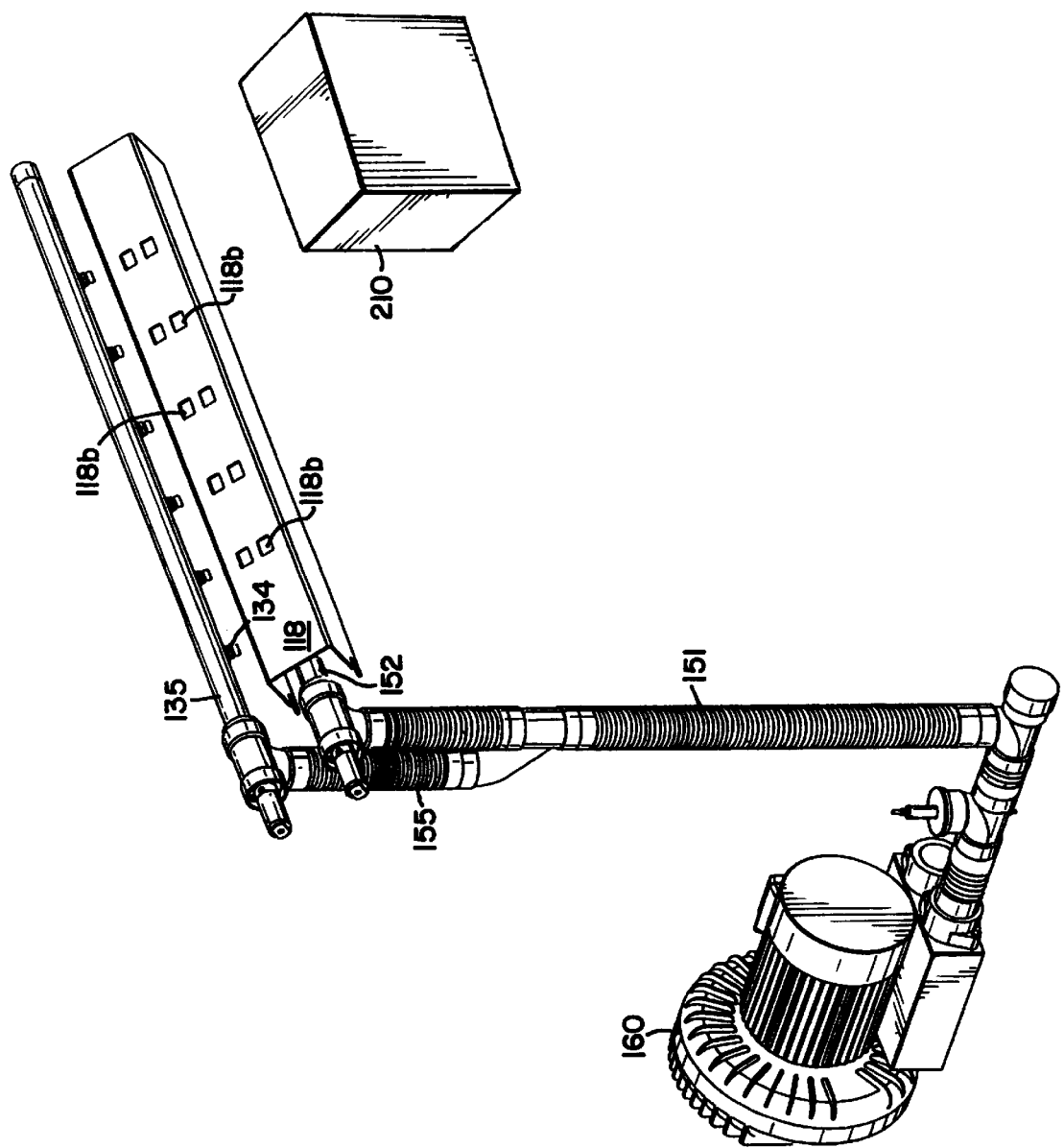
FIG. 10 is a perspective view of the blower system utilized by the apparatus shown in FIG. 1.

The system for providing the pressurized air to align the ends 148 and to blow the casings after they have been lifted is best seen in FIG. 10. A blower 160 provides a source of pressurized air which is transferred in conduit 151 to pipe 152 having opening 152a. A branch Y conduit 155 in the conduit 151 provides air to the conduit 135 through opening 135a.

After the sausage sticks 15 have been indexed into position, the cylinder arms 122 and 128 move towards the indexing conveyor thereby moving the fingers 124 and 125 to mate with the fingers 130 and 131. The loose ends 148 are caught between the combination of either 124 and 130 or 125 and 131 and are held in place. Then, the arm 122 retracts and the arm 128 continues to extend thereby lifting the loose end 148 upward, thereby removing the entire casing. After the arms have moved a sufficient distance to remove the casing from the sausage stick, the arms go back to their original position, thereby releasing the removed casing 15c. The movement of the fingers 124, 125, 130 and 131 is generally perpendicular to the length of sausage. The movement is typically five to six inches and the casing is completely removed. By having a lateral cut the entire length of the sausage casing, this relatively small perpendicular motion removes the casing, which is advantageous for a high-speed machine. However, just prior to the release of the casing from the gripping members, a blast of pressurized air enters the left end of the housing through opening 135a, and the gripping members are then released and the air blows the casings to the right until they hit the mesh screen 150. The pressurized air then stops blowing and the casings fall off of the mesh screen 150 into a collection bin 210 positioned below the mesh screen 150.

In operation, it is understood that a number of the various functions are being conducting simultaneously, to enable the apparatus to process for more sticks per hour. Further, as previously mentioned, the apparatus 10 includes duplicate functions (such as air inflate, end removal, slitting, and casing removal) to again allow the apparatus 10 to operate at a higher speed. However, for clarity, the method of the present invention will be described with respect to a sausage stick as it progresses through the various stations.

A plurality of sausage sticks 15 are placed on the input conveyor 22. The sausage sticks 15 are positioned on the indexing conveyor 51, as previously described when the input section 20 was discussed in detail. Two sausage sticks 15 are placed in the indexing conveyor and the indexing conveyor is then indexed, when the process is repeated. The indexing conveyor then indexes the sausage sticks 15 forward to the intermediate section 50. As the sausage stick 15 is indexed under the needle block assembly 60, the air cylinder 62 is initially in the retracted position. Then, the air cylinder 62 is actuated and the rod 62a extends causing the positioning surface 64a to contact the sausage sticks 15 as the needle 65 enters the sausage 15. A valve is then actuated allowing pressurized air to enter into the sausage stick 15 thereby inflating the casing 15c away from the sausage emulsion. The proximity switch 67 detects when the casing 15c has been inflated sufficiently away from the sausage emulsion and turns off the supply of pressurized air at a given point. Also, a timer may be utilized to limit the time that the pressurized air is delivered to the sausage stick 15. This is useful in the event of a blown casing where the casing 15c would not extend sufficiently far away from the emulsion to trigger the proximity switch 67.

The sausage sticks 15 are then indexed to the end cap removal section of the intermediate section 50. There, as previously described, the offset circular knifes 82 and 83 score the casing on the top and the bottom. Then, the sausage sticks are indexed to be in front of the clamp 85. The opposable jaws 86 and 87 are in an open position and the clamp is then moved forward to the sausage stick 15 where the jaws then close and grasp the end section of the sausage stick 15. The clamp 85 is then retracted tearing the remaining portion of the casing and removing the end cap 16. The jaws then open and the removed casing end cap 16 drops down into a suitable collection area such as a bin 220 shown in phantom in FIG. 1. Alternately, other suitable collection and disposal methods may be used to accumulate and/or remove the end cap sections 16 after they have been removed from the sausage sticks 15.

Figure 9:
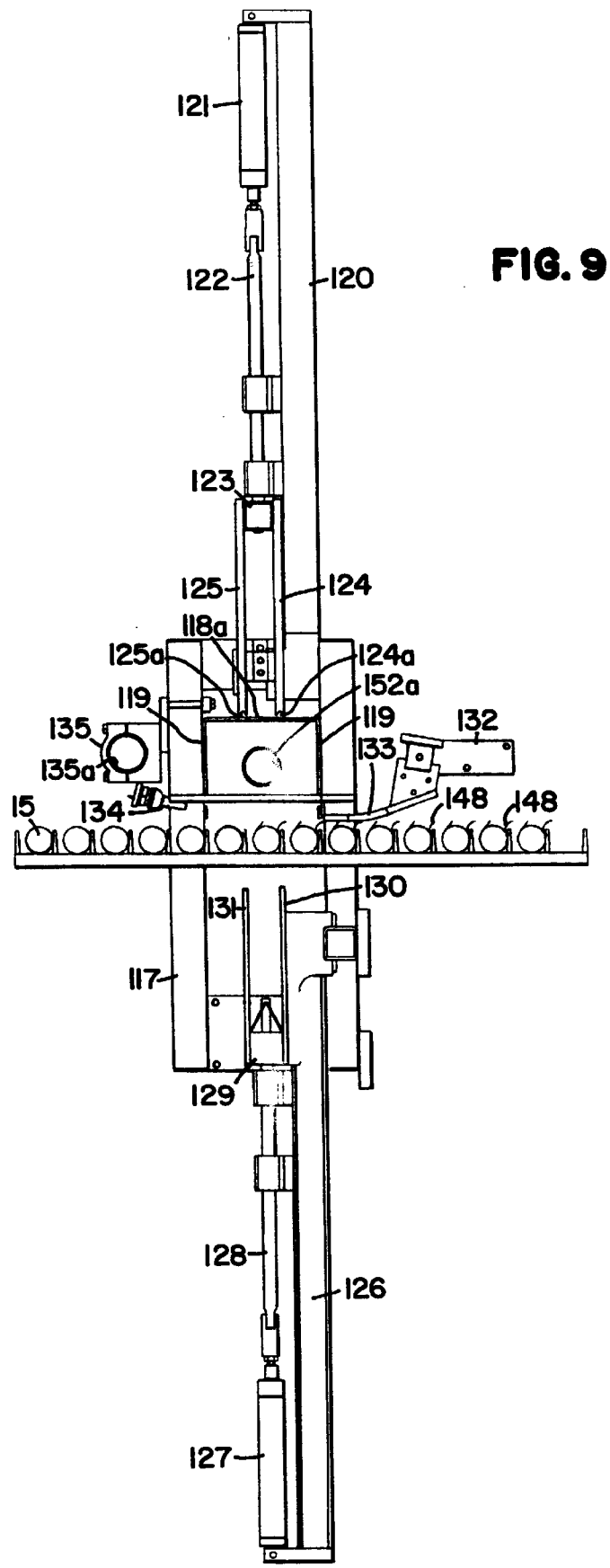
FIG. 9 is a schematic side view of the casing removal section of the apparatus shown in FIG. 1.

The sausage sticks 15 are then indexed to the casing removal section 100. The knife blade assemblies 107 and 108 are at a position to the right or left of the sausage stick 15. Then, the servo motor 102 is activated causing the knife blade assemblies 107 and 108 to go across the longitudinal length of the sausage stick 15, thereby slicing the casing 15c. This exposes two loose flaps, as shown in FIG. 9. The knife blades are then in position to be driven back in the opposite direction when the next sausage sticks 15 are indexed. The sausage sticks 15 are then indexed forward to the gripping and lifting mechanism to remove the remaining casing. As the sausage stick 15 is indexed underneath the gripping and lifting mechanism, the gripping members 124, 125, 130 and 131 are in their retracted position, as shown in FIG. 9. Then, the gripping members 124 and 125 are moved towards the sausage sticks 15 as the gripping members 130 and 131 also move towards the sausage stick 15. The loose end 148 is captured between the concave surface 124a and convex surface of the gripping member 130. Similarly, the loose edge 148 of the adjacent sausage stick 15 is captured between the concave end 125a and the gripping member 131. Then, as viewed in FIG. 9, the gripping members move upward. The travel distance of the fingers is relatively small, five to six inches, and the entire casing 15c is removed from the sausage stick 15. The gripping members are in position inside of the housing 118, holding the removed casing 15c and forced air is the provided to the housing 118 through opening 152a. The gripping members then return to their original position releasing the removed casing 15c. The pressurized air blows the removed casing up against the mesh screen 150 where it falls down to a suitable collection bin 210. However, it is appreciated that other mechanisms may be used to collect or remove the casings 15c.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An apparatus for removing casings from elongated casing-enclosed sausage sticks, comprising:

a) an indexing conveyor for receiving casing-enclosed sausage sticks;

b) inflating mechanism for inflating the casing-enclosed sausage sticks;

c) casing end cap removal mechanism for removing casing end caps from the casing-enclosed sausage sticks;

d) casing slitting mechanism for slitting the casings;

e) casing removal mechanism for removing the casings from the casing-enclosed sausage sticks; and f) staging mechanism for positioning the casing enclosed sausage sticks in the indexing conveyor; said staging mechanism comprising:

an accumulator conveyor having a discharge end;

an infeed pusher positioned under the discharge end of the accumulator conveyor, the pusher movable between a retracted position and an extended position; and the indexing conveyor positioned below the pusher, the indexing conveyor having a first slot and a second slot, the second slot positioned forward of the first slot, wherein when the pusher is in the extended position, the index conveyor positions empty first and second slots and the pusher moves to the retracted position allowing first and second casing-enclosed sausage sticks to fall with the first stick going into the first slot with the second stick on top of the first stick and when the pusher moves to the extended position, the second stick is pushed into the second slot.

2. The apparatus of claim 1, wherein the indexing conveyor is inclined.

3. The apparatus of claim 2, wherein the indexing conveyor is inclined at about 45°.

4. The apparatus of claim 1, wherein the inflating mechanism comprises:
   a) a source of pressurized air;
   b) a needle operatively connected to the source of pressurized air;
   c) a needle block for carrying the needle, the block movable between an engaged position and an unengaged position; and
   d) a proximity switch having an arm which is positioned over the stick, wherein when the casing having been properly inflated, the arm moves from its lower to its upper position, thereby stopping the pressurized air and properly inflating the casing.

5. The apparatus of claim 1, wherein the casing end cap removal mechanism comprises:
   a) scoring mechanism to score the stick proximate its end; and
   b) a gripping mechanism for gripping and pulling the casing at its end after scoring.

6. The apparatus of claim 5, wherein the scoring mechanism comprises:
   a) a top circular blade and a bottom circular blade; and
   b) the top and bottom blades being mounted to allow movement as the stick passes between the blades, wherein a score is made around a portion of the top and a portion of the bottom of the circumference of the stick.

7. The apparatus of claim 6, wherein the blades are longitudinally offset.

8. The apparatus of claim 1, wherein the casing slitting mechanism comprises:
   a) a bar having a longitudinal axis positioned above the sticks; and
   b) a rotatable knife operatively connected to the bar for movement parallel to the longitudinal axis, whereby the casing encased sticks are scored along their length as the knife moves along the bar.

9. The apparatus of claim 8, her comprising:
   a) a longitudinal gripping mechanism for releasably gripping the scored casing; and
   b) a lifting mechanism for raising and lowering the longitudinal gripping mechanism.

10. The apparatus of claim 9, further comprising:
    a) a housing at least partially enclosing the longitudinal gripping mechanism; and
    b) a source of forced air directed along the longitudinal axis of the bar, wherein after the second gripping mechanism releases the scored casing the source of forced air blows the removed casing away.

11. A disposing apparatus for disposing of end caps and elongated casings of casing-enclosed sausage sticks after removal by a removal apparatus having an end cap removal mechanism and elongated casing removal mechanism, the disposing apparatus comprising:
    a) a collection container positioned below an end cap removal mechanism for receiving end caps, the container having an opening to receive the end caps;
    b) a source of forced air;
    c) a housing for at least partially enclosing an elongate casing removal mechanism; and
    d) a conduit operatively connected to the source of forced air, the conduit having exit opening proximate the casing removal mechanism, wherein forced air blows and removes the elongated casings.

12. A method of removing casings from elongated casing-enclosed sausage sticks, comprising:
    a) supplying a plurality of elongated casing-enclosed sausage sticks to an indexing conveyor;
    b) accumulating a first and a second sausage stick, the second sausage stick is positioned on top of the first sausage stick, the first sausage stick in position in an indexing conveyor; and
    c) pushing the second sausage stick off of the first sausage stick and into the indexing conveyor;
    d) inflating the sausage sticks, whereby the casing is expanded away from the sausage sticks;
    e) removing casing end caps from the sausage sticks;
    f) slitting the casing along a length of the sausage sticks, thereby creating a loose edge of the casing; and
    g) grasping the loose edge and removing the casing.

13. The method of claim 12, further comprising blowing air across the casing after the casing is removed and releasing the grasping of the casing to allow the removal casing to be removed by the forced air.

14. The method of claim 12, wherein the casing is slit by rotating a circular knife blade and moving the circular knife blade across the length of the stick.

15. A method of removing casings from casing-enclosed sausage sticks, comprising:
    a) supplying a plurality of elongated casing-enclosed sausage sticks to an indexing conveyor;
    b) inflating the sausage sticks whereby the casing is expanded away from the sausage sticks;
    c) removing casing end caps from the sausage sticks;
    d) slitting the casing with a knife moveable along a length of the sausage sticks, thereby creating a loose edge of the casing; and
    e) grasping the loose edge and pulling in a direction generally perpendicular to a longitudinal axis of the sticks.

16. The method of claim 15, further comprising blowing air across the casing after the casing is removed and releasing the grasping of the casing to allow the removal casing to be removed by the forced air.

17. The method of claim 15, wherein the casing is slit by rotating a circular knife blade and moving the circular knife blade across the length of the stick.

18. An apparatus for removing casings from elongated casing-enclosed sausage sticks, comprising:
    a) an indexing conveyor for receiving casing-enclosed sausage sticks;
    b) inflating mechanism for inflating the casing-enclosed sausage sticks;

c) casing end cap removal mechanism for removing casing end caps from the casing-enclosed sausage sticks;

d) casing slitting mechanism for slitting the casings, the casing slitting mechanism having a bar having a longitudinal axis positioned above the sticks; and a rotatable knife operatively connected to the bar for movement parallel to the longitudinal axis, whereby the casing encased sticks are scored along their length as the knife moves along the bar;

e) casing removal mechanism for removing the casings from the casing-enclosed sausage sticks;

f) a longitudinal gripping mechanism for releasably gripping the scored casing; and g) a lifting mechanism for raising and lowering the longitudinal gripping mechanism.

19. The apparatus of claim 18, further comprising:

a) a housing at least partially enclosing the longitudinal gripping mechanism; and b) a source of forced air directed along the longitudinal axis of the bar, wherein after the second gripping mechanism releases the scored casing the source of forced air blows the removed casing away.

\* \* \* \* \*